United States Patent
Toshio et al.

[11] Patent Number: 5,129,588
[45] Date of Patent: Jul. 14, 1992

[54] APPARATUS OF SHRINKING VOLUMES OF WASTE MATERIALS OF FOAM RESIN PRODUCTS

[75] Inventors: Ikeda Toshio; Sugiyama Katsuhiko, both of Shizuoka, Japan

[73] Assignee: Suruga Seiki Co., Ltd., Shimizu, Japan

[21] Appl. No.: 653,692

[22] Filed: Feb. 11, 1991

[30] Foreign Application Priority Data

Dec. 28, 1990 [JP] Japan ............................ 2-405259[U]

[51] Int. Cl.$^5$ .................................................. B02C 19/00
[52] U.S. Cl. ...................................... 241/33; 241/100; 241/101.7; 425/147; 425/202; 425/215; 425/378.1
[58] Field of Search ............... 425/378.1, 113, 147, 425/202, 215, 216, 217; 264/37, 38; 241/DIG. 38, 101.7, 36, 65, 242, 243, 101.5, 101.2, 224, 33, 100

[56] References Cited

U.S. PATENT DOCUMENTS

| | | | |
|---|---|---|---|
| 3,589,276 | 6/1971 | Swallert | 425/202 X |
| 3,623,188 | 11/1971 | Holly | 425/202 X |
| 3,956,981 | 5/1976 | Pitt | 425/202 X |
| 4,091,967 | 5/1978 | Kinoshita | 425/202 X |
| 4,460,277 | 7/1984 | Schulz et al. | 425/202 X |

FOREIGN PATENT DOCUMENTS

2171638  9/1986  United Kingdom ............... 425/202

Primary Examiner—P. W. Echols
Attorney, Agent, or Firm—Nields & Lemack

[57] ABSTRACT

An apparatus according to the invention is for treating waste materials of foam resin products having been used mainly as packing or wrapping materials, which is provided with a crushing room furnishing stationary cutting edges and rotatably moving cutting edges at the lower part of a hopper into which the waste foam resin materials are thrown, and at the outside of the crushing room, a cylindrical volume shrinking mechanism which receives the destroyed resin products and send them in succession, heats to soften and fuse them one another, and effecting heat and pressure thereto so as to de-foam and extrude the resin like a hot chewing cake or a hot birdlime. The cylindrical volume shrinking mechanism has an extruding nozzle opening upward, from which the resin is charged into a metal mold cylinder and when this charging amount reaches to a certain level, the operation of the cylindrical volume shrinking mechanism is stopped.

12 Claims, 9 Drawing Sheets 5,129,588

APPARATUS OF SHRINKING VOLUMES OF WASTE MATERIALS OF FOAM RESIN PRODUCTS

FIELD OF THE INVENTION

The present invention relates to an apparatus for shrinking volumes of foam resin waste material products having been used as packing materials and others.

BACKGROUND OF THE INVENTION

Since foam resins, represented by styrene foam or polyethylene foam, have characteristics of heating resistance, light weight or cushion property, they are often used as packing materials (transporting boxs, etc.) of fishery products or fresh foods, wrapping materials for transporting electrical instruments, machines and others. Further, they are previously used in various industrial fields about building materials. Especially, in view of formability, moisture and chemical proofings and for being low in cost and harmless, the polyethylene foam has recently been frequenty used.

Those foam resin products are indeed expedient in use, but turn out burdensome after their services because they are bulky. Besides, as waste resin materials are produced in factories, enterprises or stores, they have difficulties in post treatments. The waste materials of foam resin products have been burnt up so far, but being made of a high molecular compound, firing furnaces are damaged by the high calories necessary for incineration, or much smoke causes problems of circumferential pollution.

Fish or vegetable markets have often installed smelting machines as measures for treating waste resin products, but the smelting machine has been large-scaled to occupy a wide space and has required much kerosene, electric power and three to four specialists, so that treating costs have been high. Since the waste foam resin materials were perfectly molten to be liquid, there arose the problem of offensive oder or harmful gas by local heating or thermal decomposition.

The inventor proposed in Japanese Utility Model Application No. 11523/1990 an apparatus of shrinking volumes of waste resin materials which crushes the waste foam materials, extrudes them and at the same time cuts them into chips with a rotating cutter. However, the waste resin materials are not always separated from other packing materials or wrapping ones, but are very often thrown away together with corrugated card boards, cellulous foreigners such as fabric pieces or metallic foreigners such as nails, screws or staples. In this case, the prior art easily causes difficulties such as cloggings in an extruding range, damaging of cutter edges at outletting of the extruded materials from a nozzle, and each time the operation of the machine must be stopped, so that stable continuous operation is difficult and results in high running costs.

SUMMARY OF THE INVENTION

It is an object of the invention to provide a compact and economical treating apparatus which may be positioned at any desired place, and crushes into shreds waste materials of thermoplastic foam resin products as styrene foam or polyethylene foam having been only thrown thereinto, may de-foam them, and form them into handy lumps such as blocks or pillars.

It is another object of the invention to provide a treating apparatus which may stably and easily carry out continuous operations by causing no difficulties such as cloggings even if the corrugated card boards, cellulous materials such as fabrics or metals as nails, screws, staples and others are mixed in.

For accomplishing the above mentioned objects, the present invention provides a crushing room tapered downward under a hopper into which the waste foam resin products are thrown, and furnishes a crushing mechanism comprising a rotatably crushing shaft having a plurality of moving cutting edges thereon and a plurality of stationary cutting edges.

There is, by the crushing room, provided a cylindrical mechanism for shrinking volume of the crushed foam resin material. The cylindrical volume shrinking mechanism has in succession a sending range with an inlet, one part of which opens toward the crushing room and transferring the foam resin products crushed in pieces by the crushing mechanisms; a volume shrinking range which heats and softens the crushed resins and fuses them one to another; and a kneading and de-foaming range which gives heat and pressure to the softened and fused resins to be like a hot birdlime or chewing cake. The kneading and de-foaming range is equipped with an extruding nozzle mechanism having a jet hole opening upward.

The above stated volume shrinking range and the kneading and de-foaming range are preferably composed of a straight cylinder smaller in inner diameter than a cylinder composing the sending range, and a rotating screw is rotatably inserted from the sending range to the volume shrinking range.

The rotating screw terminates at the end of the volume shrinking range, and the kneading and de-foaming range is connected with a kneading bar smaller in an outer diameter than the diameter of a screw vane. The kneading bar is formed with indentations on its outer circumference.

Further, in the present invention, a vertical metal mold cylinder is detachably furnished to the side of the apparatus from the hopper to the main body frame. The metal mold cylinder has a hole at its bottom for mounting the jet hole of the extruding nozzle mechanism. The hopper is furnished at the side with a cover for the metal mold cylinder, and the cover has a switch element (a switch or an operating piece) for stopping driving of the rotating screw when the shrinked resin extruded from the extruding nozzle mechanism into the metal mold cylinder reaches a certain amount.

According to the above mentioned structure, if only the bulky foam plastic waste materials are thrown into the hopper having been used as the packing or wrapping materials, they are cut into shreds, and while being discharged from the crushing room and transferred, they are de-foamed and changed into a small cubage by the heat and the pressure, and re-produced as lumps of required shapes and sizes. The lumps may be utilized as forming materials for re-produced plastic products or piles, columes, sleepers or false woods.

When the shrinked resin is changed into the predetermined shape and size, the operation is automatically stopped, and it is extruded like a bar, not cut in shreds by a cutter, and de-foamed as securing a room of large capacity in the extruding range, whereby even if papers, wood pieces, metal pieces and others are mixed, any cloggings are not caused, and the resin may be smoothly extruded.

In addition, the rotating screw is enough to be straight with a certain determined diameter, neither requiring any screw vane changing the diameter to be tapered nor any extruding screw vane of small diameter, so that the structure may be simple and economical.

The aforementioned mold metal cylinder may be single or plural. If the metal mold cylinder is single, the nozzle body of the extruding nozzle mechanism is directly fixed to the end of the extruding range. In this case, the axial front end of the extruding range is closed with an end plate.

If the metal mold cylinder is plural, the extruding nozzle mechanism is provided with a base cylinder extruding from the front end of the extruding range to the axial direction, a right-left diverging cylinders and a plurality of nozzle bodies communicating with the diverging cylinders, and a switching valve for switching the flow of the shrinked resin from the base cylinder to the diverging cylinder This form is suitable for efficient operation.

In this case, preferably the switching valve is provided with a switching operation piece for the driving source of the rotating screw. Thus, the flow of the resin is switched by the switching valve, and concurrently the rotating screw starts to drive.

Other characteristics and merits of the invention will be apparent from the following explanations with the attached drawings. But as far as providing the basic charactistics of the invention, they are not limited to the structure shown in the embodiments.

DETAILED DESCRIPTION OF THE PREFERRED EMBODIMENTS

Figure 1:
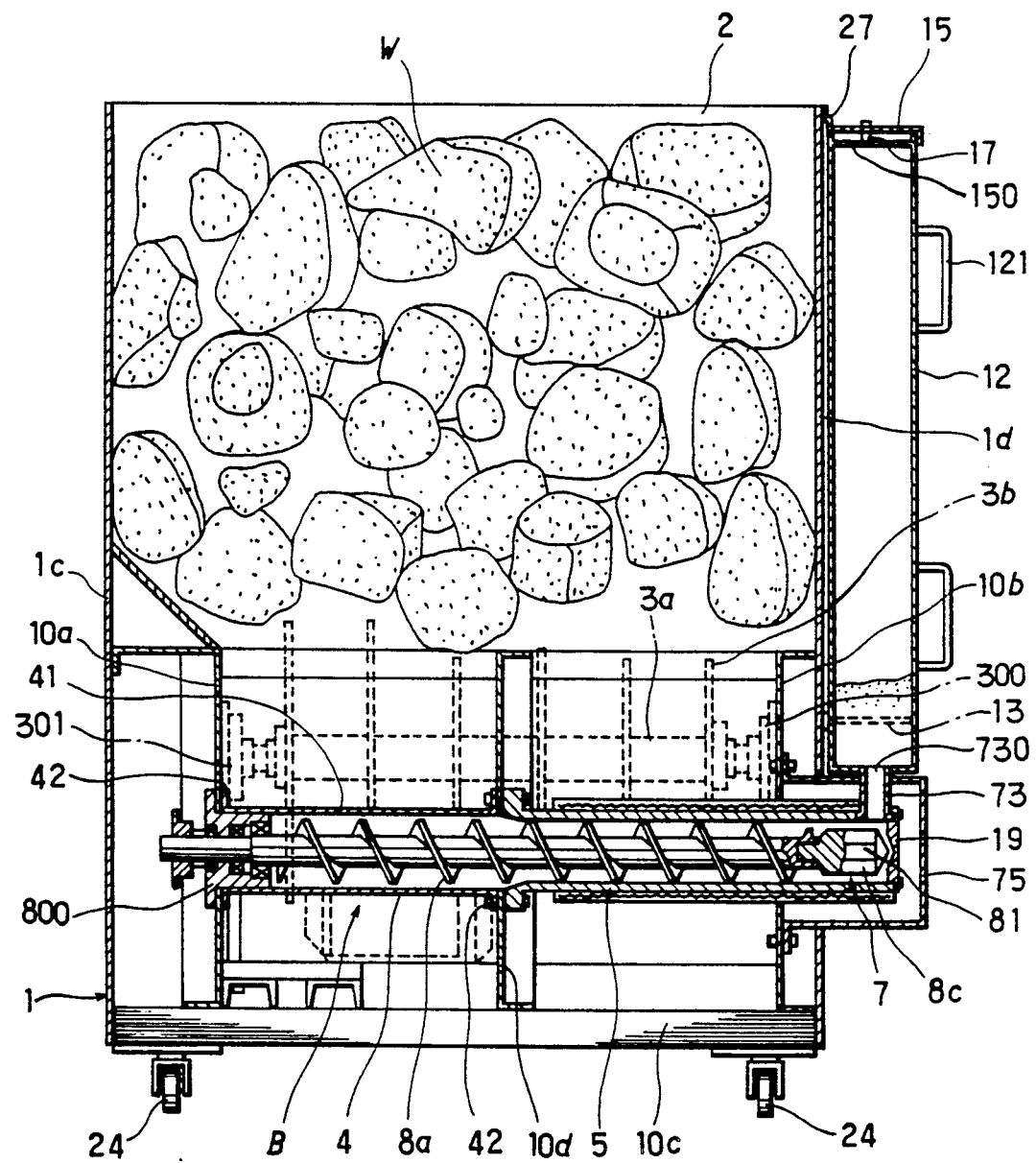
FIG. 1 is a side view, partially in section, showing a basic embodiment of an apparatus of shrinking volumes of waste resin materials according to the invention.

FIGS. 1 to 5 illustrate a basic embodiment of an apparatus of shrinking volumes of waste foam resin materials according to the invention.

The reference numeral 1 designates a box shaped frame of a main body, and opposing side plates 10a, 10b are secured on a rectangular bed frame 10c made of a steel material, and cover plates 1a, 1b, 1c, 1d expand back-forth and right-left to surround the side plates 10a, 10b. The main body frame 1 is movable by casters 24 equipped to the bed frame 10c. A bottom plate 1e tapering downward (FIGS. 4 and 5) is provided between the side plates 10a, 10b within the main body frame 1. A crushing room A opening in an upper part is composed with the side plates 10a, 10b and the bottom plate 1e, and a hopper 2 of square cross section is fixedly carried to the main body frame 1 at the upper part of the crushing room A. The waste foam resin materials W are thrown into the hopper 2 and accumulated on the bottom plate 1e.

The reference numeral 3 designates a crushing mechanism for crushing the waste resins W into chips, traversing through a relatively upper range of the crushing room A and having a crushing shaft 3a which is rotatably laid to the side plates 10a, 10b via bearings 300, 301, and moving cutting edges 3b of plural sheets fixed on the crushing shaft 3a at determined spaces, and stationary cutting edges 3c which make couples with the moving cutting edges 3b and are secured to the oblique wall of the bottom plate 1e.

The crushing shaft 3a has two sheets of sprockets 32, 320 at an end of the shaft protruding from the side wall 10a, and one of the sprockets 32 is connected, via a chain 35, to a drive sprocket 34. Said sprocket 34 is fixed to an output shaft of a motor 33. Said motor 33 is mounted in a space outside the bottom plate 1e. Said sprocket 32 is rotated at a predetermined speed.

Figure 4:
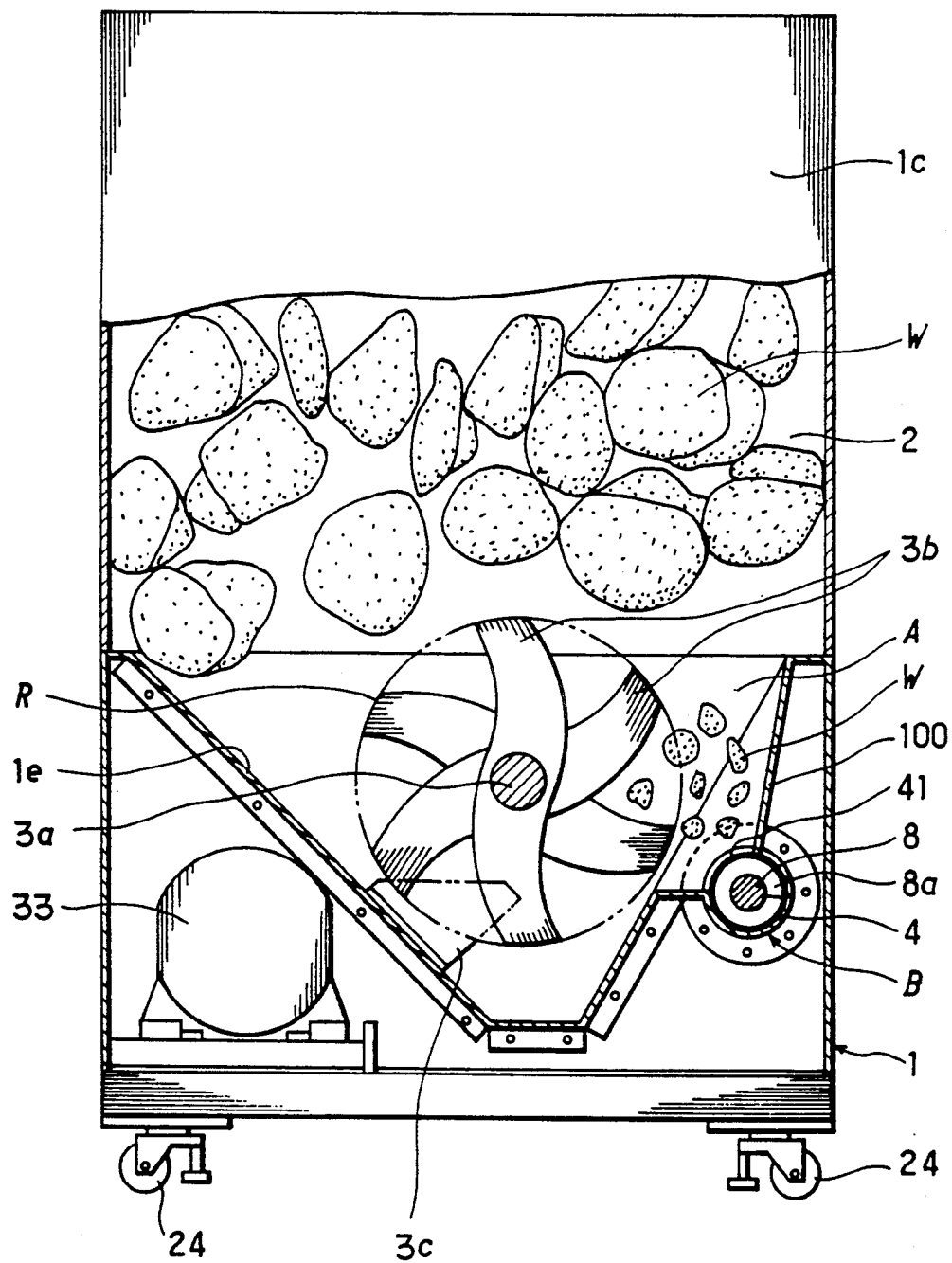
FIG. 4 is a vertically cross sectional view of the same.
Figure 5:
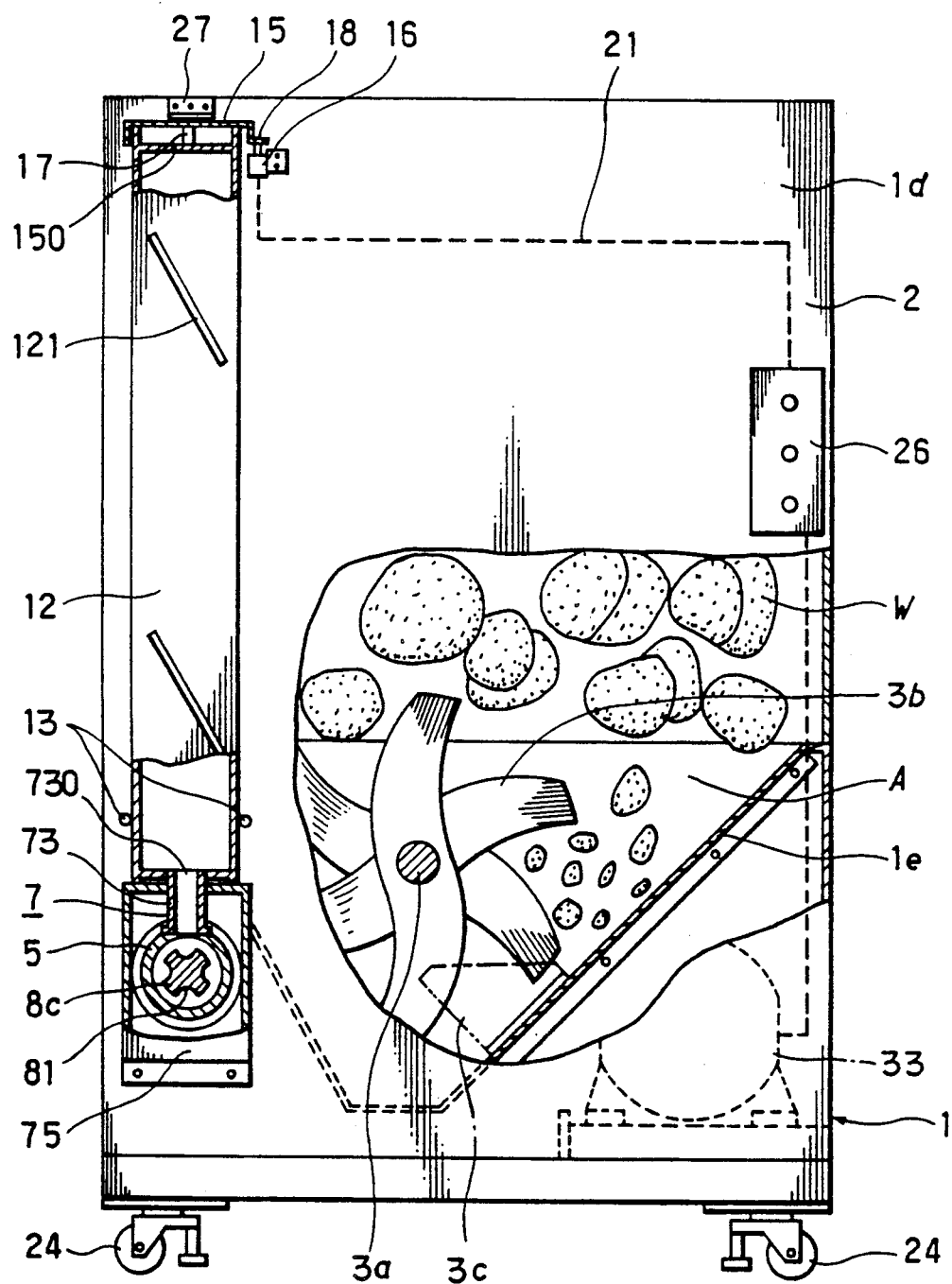
FIG. 5 is a rear view, partially in section, of the same.

The moving cutting edges 3b are six sheets in the present embodiment, and have lengthes such as radius of gyration R reaching within the hopper 2 as shown in FIG. 4. The moving cutting edges 3b are waved seen from their sides, and mounted on the crushing shaft 3a to have cutting edge per each 60°. In this embodiment, each adjacent two sheets of the cutting edges are provided at the same angle. Cutting edges shaped in crescent of small radii may be, as required, added in rotating sides, and mounted on the crushing shaft 3a to have cutting edge per each 60°. In this embodiment, each adjacent two sheets of the cutting edges are provided at the same angle. Cutting edges shaped in crescent of small radii may be, as required, added in rotating direction at intermediate portions of the moving cutting edges 3b. The stationary cutting edges 3c make couples with the moving cutting edges 3b at small clearances.

Figure 2:
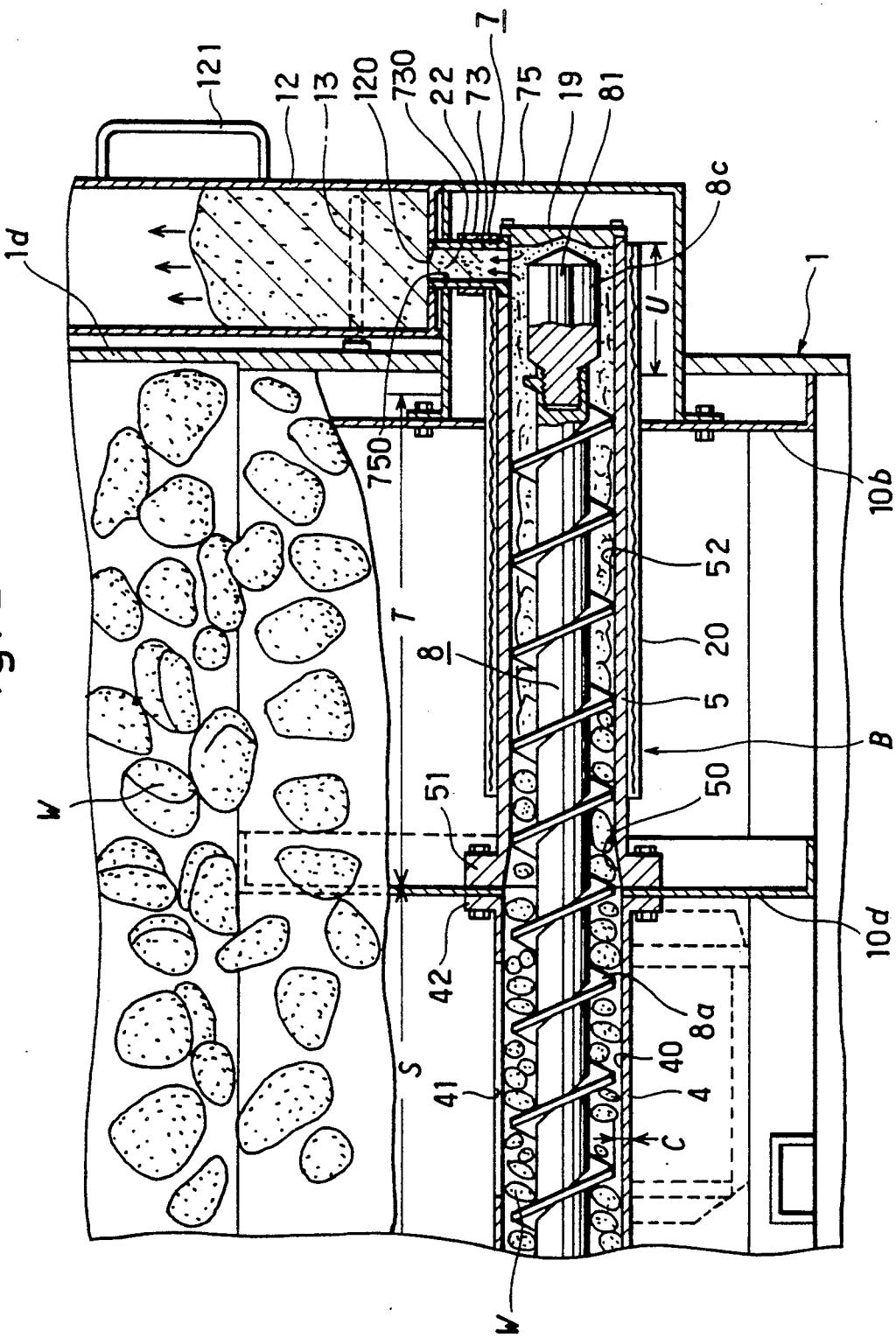
FIG. 2 is a partially enlarged view of the above embodiment.

The reference letter B designates a volume shrinking mechanism shaped in the form of a cylinder which is positioned parallel to the crushing shaft 3a outside of the crushing room A, especially outside of the bottom plate 1e at the opposite side of the stationary cutting edges 3c. This cylindrical volume shrinking mechanism B has, as shown in FIG. 2, a sending range S for transferring the waste resin pieces at determined speed, a volume shrinking range (softening range) T for heating to soften and fusing the waste resin pieces one to another as transferring, and a kneading and de-foaming range U for effecting heat and pressure thereto while kneading the softened and fused resins, thereby to remove air bubbling components to make heated chewing cake or birdlime.

Figure 3:
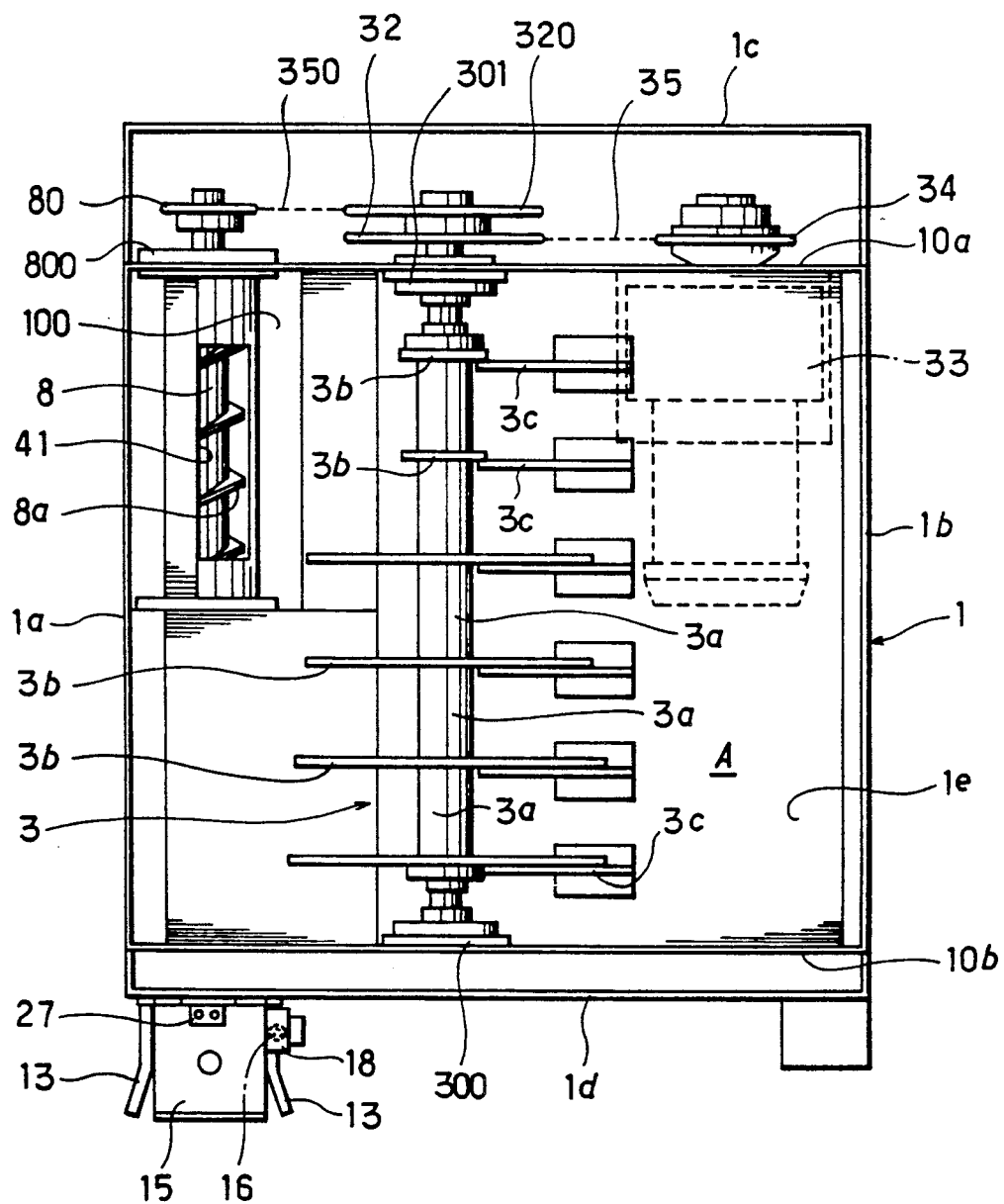
FIG. 3 is a laterally cross sectional view of thereof.

The cylindrical volume shrinking mechanism B has two straight cylinders 4, 5. The first cylinder 4 is straight having flanges 42, 42 at both ends, and one 42 of the flanges is fixed to the side plate 10a, while the other flange 42 is fixed to the support plate 10d standing on the bed frame parallel to the side plate 10a. The first cylinder 4 has an inlet 41 for receiving the waste resin pieces W crushed in the crushing room A, and the inlet 41 communicates with an exhaust part 100 formed in the side wall of the bottom plate 1e as seen in FIGS. 3 and 4.

The second cylinder 5 is also straight, and its flange 51 at a rear end is fixed to the support plate 10d. The second cylinder 5 is coaxial with the first cylinder 4, and has a short tapered wall 50 at the rear end of the inner diameter side, and a front part than the tapered wall 50 is a straight hole 52 of a smaller diameter than the inner diameter of the first cylinder 4. The second cylinder 5 is encircled with a band or tape like heater 20 on the outer circumference thereof, which heats at a temperature sufficient to soften the waste resins W passing within the second cylinder 5 (normally not higher than 180° C.).

The cylinders 4, 5 of the volume shrinking mechanism B have rotating screws 8 of length terminating at an appropriate rear part from the front end of the second cylinder 5, which is, as shown in FIG. 1, one side-supported by a bearing 800 provided at the rear part of the first cylinder 4. The rotating screw 8 is furnished at the shaft end with a sprocket 80 connected, via a chain 350, to a sprocket 320 mounted on the crushing shaft 3a, whereby the rotating screw 8 is cooperated with the crushing shaft 3a by the drive of the motor 33.

The rotating screw 8 has a screw vane 8a of diameter corresponding to the straight hole 52 of the second cylinder 5, and the screw vane 8a has the same diameter, excepting its end part. Accordingly, as seen in FIG. 2, an appropriately large clearance C is defined between the outer diameter of the screw vane 8a and the cylinder wall 40 within the first cylinder 4.

A kneading shaft 8c is coaxially connected by screwing to the shaft end of the rotating screw 8 terminating at the front end of the second cylinder 5, and is smaller in outer diameter than the diameter of the screw vane 8a, and formed with grooves 81 parallel to or oblique with respect to the screw shaft on its outer circumference, thereby to have indentations.

Accordingly, the sending range S is formed with the first cylinder 4 and the rotating screw 8 thereabout, and the volume shrinking range T is formed with the part from the rear end of the second cylinder 5 to the front end, and the rotating screw 8 and the heater 20, and the kneading and de-foaming range U is composed with the front end of the second cylinder 5, the kneading shaft 8c and the heater 20 thereabout.

An extruding nozzle mechanism 7 directing a jet hole 730 upward is provided in the kneading and de-foaming range U, i.e., at the front end of the second cylinder 5 or thereabout.

In this embodiment, the extruding nozzle mechanism 7 comprises a single nozzle body 73 secured vertically to the end part of the kneading and de-foaming range U, i.e., near the front end of the second cylinder 5 and furnished with a heater 22 on the outer circumference as shown in FIG. 2. On the other hand, the opening at the front end in the axial direction of the second cylinder 5 is closed with an end plate 19. At the outside of the kneading and de-foaming range U, as shown in FIG. 2, a bed 75 serving also as a cover is arranged and is detachably fixed to the side plate 10 which has a supporting hole 750 allowing the nozzle body 73 to pass through and the nozzle 73 projects upward at a desired length.

The reference numeral 12 designates a metal mold cylinder which is detachable with respect to the extruding nozzle mechanism 7 and vertically lengthy of a desired cross section such as polygonal or circular shape. It may be of course tapered in the height or formed in indentations. The metal mold cylinder 2 has, at its bottom, a charging hole 120 for fitting on the outer circumference of the front end of the nozzle body 73, and the bottom lower than the charging hole 120 is mounted on the bed 75. The metal mold cylinder 12 is supported vertically from the main body frame 1 to the hopper 2 by at least one couple of holding arms 13 prepared at the side of the main body frame 1. The metal mold cylinder 12 is equipped with a handle 121 on its outer circumference.

The reference numeral 15 designates a cover for an upper opening of the metal mold cylinder 12. In this embodiment, the side wall of the hopper 2 (a cover plate 1d extends herein) is secured with a hinge 27 which openably connects two sheets of plates by means of fulcrum pins to which a cover body 15 is attached, so that the cover body 15 may be tilted.

The cover body 15 is secured with a suspending member 17 from which an intermediate cover 150 is supported, while the cover body 15 is provided with a limit plate of bracket shape side of its outside. The hopper 2 is equipped at its side wall with a limit switch 16 contacting the limit plate 18 under a condition that the cover plate 15 overlays the metal mold cylinder 12.

The limit switch 1 is electrically connected to an electric feed controller 26 for the motor 33 via a wiring 21 so as to drive the motor 33 when the limit plate 18 contacts the limit switch 16. The charged resins going upward within the metal mold cylinder 12 upheaves the cover 15 through the intermediate cover 150, and the cover 15 is tilted around the fulcrum of the hinge 27, so that when the limit plate 18 separates from the limit switch 16, the limit switch 16 is OFF, and the motor 33 stops driving by this signal.

Figure 6:
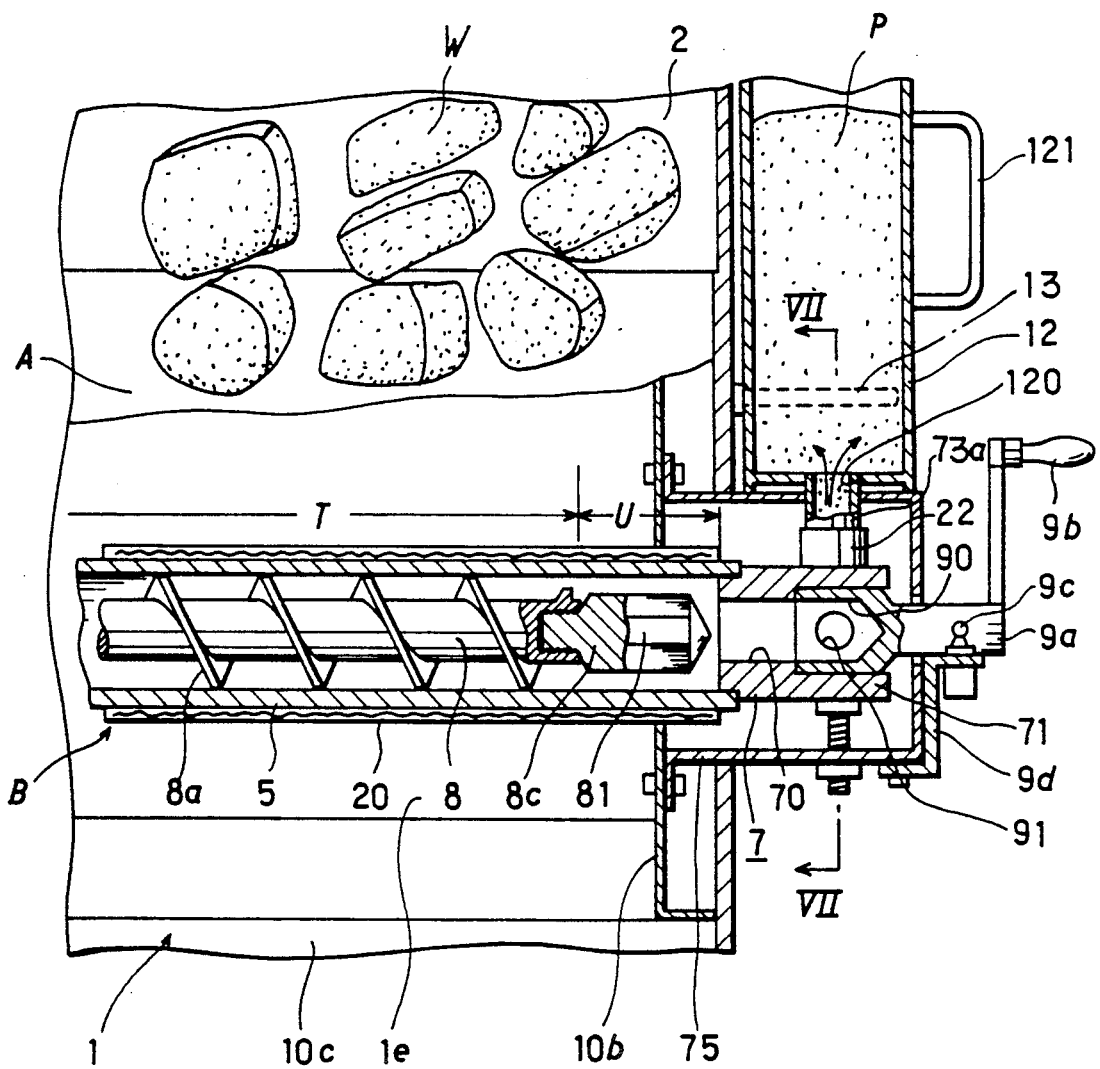
FIG. 6 is a partially side view showing the other embodiment of the inventive apparatus.
Figure 7:
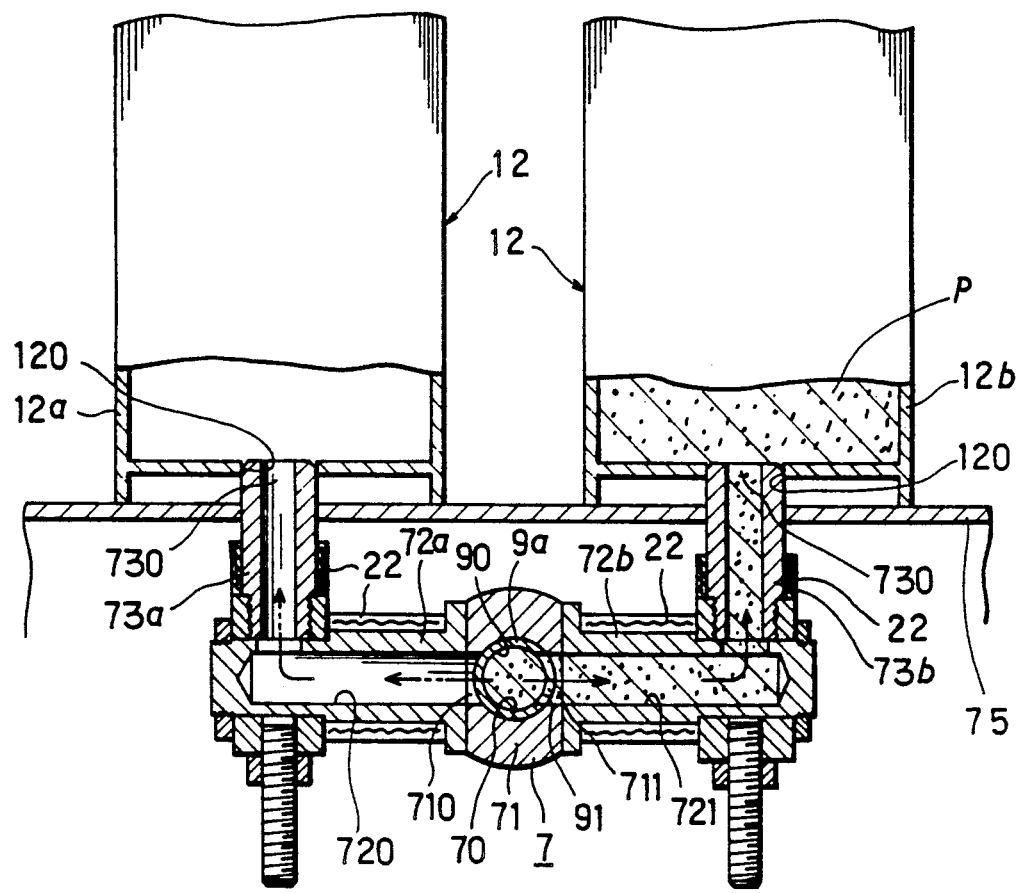
FIG. 7 is a cross sectional view along VII—VII of FIG. 6.
Figure 8:
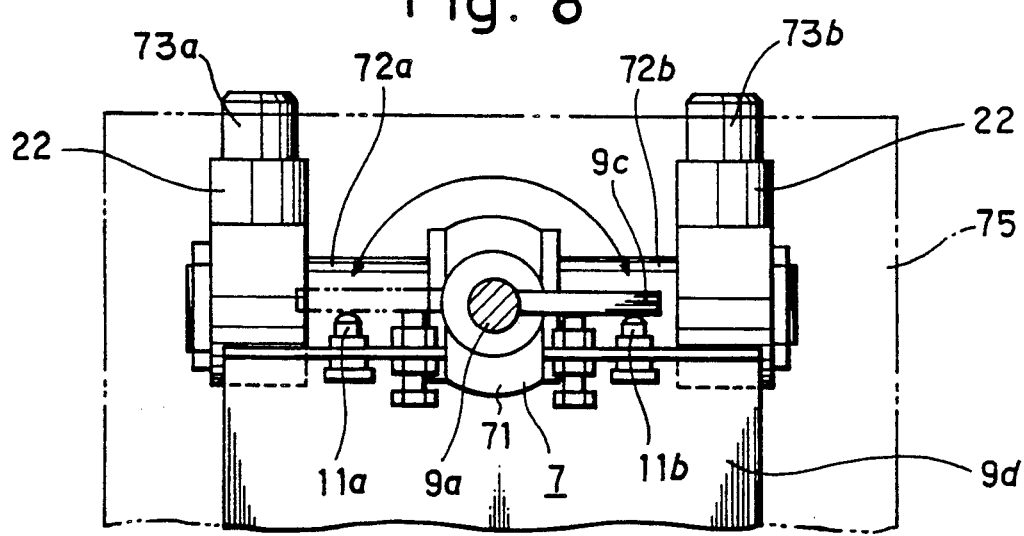
FIG. 8 is a rear view of a switching valve portion of the above embodiment.

FIGS. 6 to 8 show the other embodiment according to the present invention.

The extruding nozzle mechanism 7 of the above mentioned embodiment is a single extruding nozzle body, while the present embodiment uses two extruding nozzle main bodies 73a, 73b for alternately charging and forming the shrinked resins in two metal mold boxs 12 (called as "12a, 12b" for the sake of explanation.

To state in detail, as shown in FIG. 6, the extruding nozzle mechanism 7 has a base cylinder 71 fitting the opening at the front end in the axial direction of the second cylinder 5. The base cylinder 71 has, as seen in FIG. 7, a hole 70 in the axial direction coaxial with the second cylinder 5 and lateral holes 710, 711 diverging to right and left. The base cylinder 71 is fixed at the right and left sides with diverging cylinders 72a, 72b having holes 720, 721 meeting the lateral holes 710, 711. At the front ends of the cylinder holes 720, 721, the extruding nozzle bodies 73a, 73b are vertically fixed which have jet holes 730, 730 at upper parts thereof. The diverging cylinders 72a, 72b and the nozzle bodies 73a, 73b are furnished with heaters 22 on the respective outer circumferences.

Further, a switching valve 9 is provided for selectively switching flows of the resins from the base cylinder 71 to the diverging cylinders 72a, 72b. The switching valve 9 comprises a valve shaft 9a fitted in the hole 70 in the axial direction, an operating handle 9b for rotating the valve shaft 9a, a valve hole 90 coaxial with the hole 70, and a single switching hole 91 transverse with the valve hole 90.

The valve shaft 9a has a bar like operating piece 9c at the outside of the same position in the circumferential direction as the operating handle 9b. At the right and left positions within the radius of gyration of the operating piece 9c, limit switches 11a, 11b are positioned via a bracket 9d carried to the bed 75, which are connected to an electric feed controller shown in FIG. 5 through wiring (not shown), and when the operating piece 9c contacts either one of the limit switches 11a, 11b, the motor 33 is started.

This embodiment is the same as the aforementioned one in the structures of the main body frame 1, the crushing room A, the crushing mechanism 3 and the volume shrinking mechanism B, and so explanations therefor are omitted.

Figure 9:
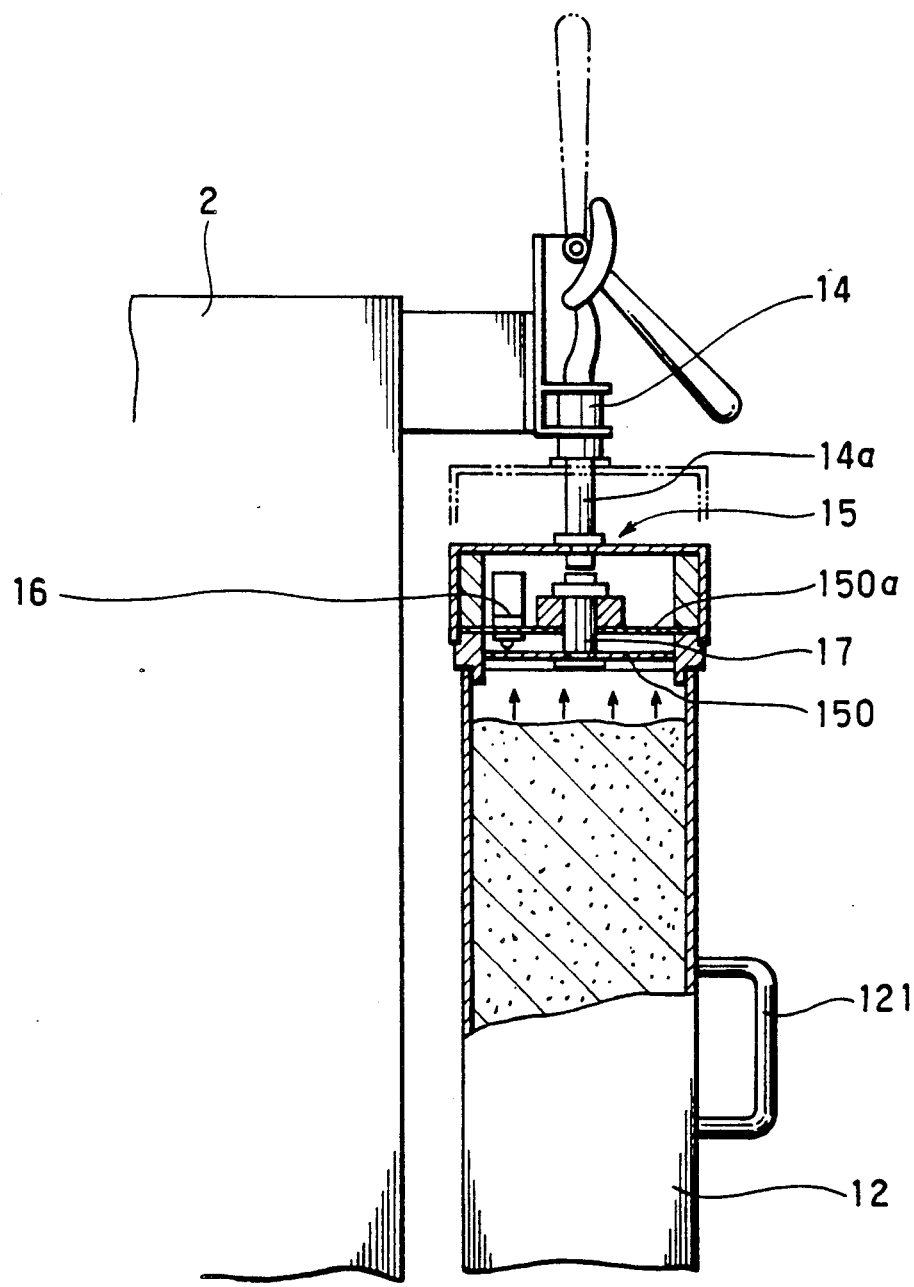
FIG. 9 is a side view showing the other embodiment of a cover for a metal cylinder.

FIG. 9 shows the other embodiment of the cover body 15 of the present invention. Herein, the hopper 2 is attached with a cover opening mechanism 14 of clamp system to its side wall, and the cover body 15 is suspended from an elevating rod 14a of the mechanism 14. The cover 15 is expanded with a fixed plate 150a therewithin from which the intermediate cover 150 serving also as the limit plate is suspended via a vertically movable suspending member 17, and which is furnished with a stopping limit switch 16. The limit switch 16 is electrically connected to the electric feed controller of the motor 33 via wiring (not shown) as in the aforementioned embodiment, and a circuit is incorporated for stopping the drive of the motor when the shrinked resins going upward within the metal mold cylinder 12 upheaves the intermediate cover 150. The cover structure of FIG. 9 may be applied to each of the embodiments shown in FIGS. 6 to 8.

The valve shaft 9a of the switching valve 9 may be automatically switched by an actuator such as motor or cylinder, instead of a manual system. In any of the embodiments, the drive control of the motor 33 may depend upon control of transmission of the driving force from the drive sprocket 34 to the sprocket 32 by breaking and making an electromagnetic clutch other than a system of stopping the electric feed to the motor.

Figure 10:
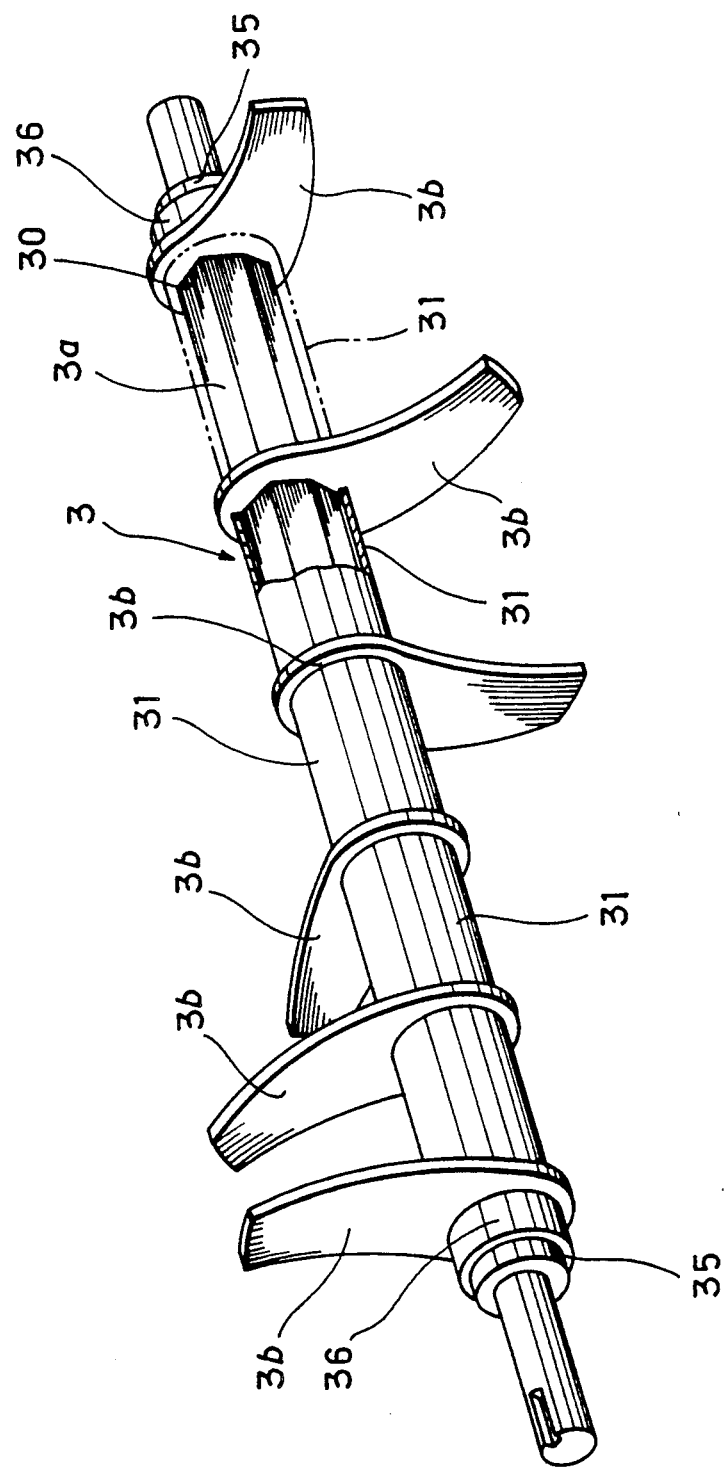
FIG. 10 is a perspective view showing the other embodiment of a crushing shaft.

FIG. 10 shows the other embodiment of the crushing mechanism of this invention.

In this embodiment, the moving cutting edges 3b comprise six curved sheets which shift in succession phases by 60° in the circumferential direction with respect to the crushing shaft 3a. The moving cutting edge 3b has the radius of gyration of length reaching within the hopper as said above, and formed with a real hexagonal hole 30 at its base end so as to be mounted on the crushing shaft 3a of the hexagonal cross section excepting the both ends. Spacers 31 are mounted between the moving cutting edges 3b on the outer circumference of the crushing shaft, and collars 36, 36 are positioned at the outsides of the moving cutting edges 3b so as to secure the spaces by securing nuts 35, 35 on screws formed in the crushing shaft 3a. This embodiment has a merit of exchanging the moving cutting edges 3b.

OPERATION

A further explanation will be made to the use and operation of the inventive apparatus.

The inventive apparatus is positioned at any desired place where the waste materials W of foam resin products, for example, the packing, wrapping materials and others made of polyethylene foam or styrene foam are created.

In the embodiment shown in FIGS. 1 to 5, for treating the waste foam resin materials W, the waste materials are thrown into the hopper 2 as they are or destroyed in appropariate sizes, and charged into the crushing room A and accumulated on the bottom plate 1e.

On the other hand, as illustrated in FIGS. 1 to 5, the charging hole 120 of the metal mold cylinder 12 is fixed to the nozzle body 23, and mounted on the bed 75. Since the metal mold cylinder 12 is thereby supported vertically by the holding arm 13, the cover body 15 is mounted on the upper end opening of the metal mold cylinder 12. Thus, the metal mold cylinder 12 is set, and at the same time, since the limit plate 18 of the cover body 15 contacts the limit switch 16, the motor 33 is made ready for driving.

Under this condition, if the motor 33 is driven by operating the electric feed controller 26 and the heater 20 is operated, the waste foamed materials W passed the hopper 2 and stored in the crushing room A are cut into pieces efficiently by means of the moving cutting edges 3b and the corresponding stationary cutting edges 3c.

Namely, since the radius of gyration of the moving cutting edge 3a reaches within the hopper 2, the waste resins W are destroyed at the lower layers without causing bridging phenomena. In addition, a plurality of moving cutting edges 3b successively shift the phases in the circumferential direction, and each of them is mesh with the stationary cutting edge 3c at a small clearance. Thus, the cuttings are carried out successively and non-cut parts of the resins are cut while they are being sent axially of the crushing shaft. The waste resin materials W are destroyed in shreds without running idle in the crushing room A or getting intertwined on the crushing shaft.

The waste resins W pass through the exhaust part 100 provided in the oblique wall of the bottom plate 1e, and are charged successively into the first cylinder 4 from the inlet port 41. The materials having heavy specific gravity as metals are accumulated on the bottom plate 1e. The materials of heavy specific gravity can be easily taken out if an opening cover is equipped at the side plate 10b.

The rotating screw 8 rotates in the first cylinder 4, and since the inner diameter of the first cylinder 4 is larger than the diameter of the screw vane 8a, the waste resins not yet cut can be charged thereinto, and are sent forward by the screw vane 8a.

The resins W enter the straight hole 52 as being compressed by the tapered cylinder wall 50 at end of the second cylinder 5. The diameter of the straight hole 52 has little clearance in relation with the screw vane 8a, so that the waste resins W do not go rearward, and the sending speed is increased. Since the second cylinder 5 has the heater 20 on its outer circumference, the resins W are smoothly sent forward as being heated and are fused at the same time with increasing the density. Thus, load to the rotating screw 8 is small.

In the front range of the second cylinder 5, the kneading bar 8c rotates together with the screw vane 8a. The kneading bar 8c has no sending function or a very weak function. Accordingly, the foam resins W are lowered in the moving speed in this range and stagnated, and the de-foaming is progressed by the pressure of the resins sent by the rotation of the screw vane 8a and the heat of the resin.

Besides, the resins W are half molten by the heater 20 and caught by the indentations 81 of the kneading bar 8c, and rotated about the axial line of the screw 8. This rotation and the axial sending by the rotating screw 8 cross each other to effectively de-foam the resins, but the de-foaming is not perfect so that the resins are kneaded as lime or chewing cake. The de-foaming gas escapes rearward via the clearance of the screw vane 8a and the straight hole 52, and is exhausted into the crushing room A from the clearance between the sending cylinder 4 and the screw vane 8a.

The thus kneaded and de-foamed shrinked resin P is urged into the nozzle body 73 which is installed at the front end of the second cylinder 5 and opens, and pushed out into the metal mold cylinder 12 via the jet hole 730 while being heated by the band heater 22. The de-foamed and shrinked resin P is accumulated on the bottom of the metal mold cylinder 12 and goes upward as the time passes. When the resin P fills therewithin until it upheaves the intermediate cover 150 at these top part, the cover 15 tilts around the fulcrum of the hinge 27. Then, the limit plate 18 separates from the limit switch 16. Thereby the driving of the motor 33 is automatically stopped, and the drivings of the crushing shaft 4a and the rotating screw 8 are stopped.

If the metal mold cylinder 12b is slightly lifted up by the handle 121, and the charging hole 120 is taken off from the nozzle body 73, the metal mold cylinder 12 is made free, and the resin P is sent by the handle 121 and charged into a cooling means such as a water tank, whereby the resin is solidified to re-products such as false pillars or stakes. If being thrown into the crushing machine, they will be pellets.

A spare is prepared as the metal mold cylinder 12, and if the spared metal mold cylinder 12 is attached to the nozzle body 73, the limit switch turns ON. If the above mentioned cycle is repeated, the resin may be shrinked and reproduced.

In the embodiment shown in FIGS. 6 to 8, each of the charging holes 120 of the metal mold cylinders 12a, 12b is mounted on each of the nozzle bodies 73a, 73b, so that the metal mold cylinders 12a, 12b are supported along the hopper 2. The operating handle 9b is operated and the valve hole 90 of the valve shaft 9a is communicated with either of the cylinder holes 720, 721.

The following operations are the same as mentioned above, and the waste foam resin products W accumulated in the crushing room A via the hopper 2 are cut into chips effectively by means of the moving cutting edges 3b and the corresponding stationary cutting edges 3c. The waste resins W are successively sent from the inlet port 4 installed at the intermediate part of the bottom plate 1e to the first cylinder 4, and heated and softened in the second cylinder 5 to be changed into elastic resins as hot lime in the range at the front end of the second cylinder 5.

The de-foamed and shrinked resin P is urged from the front end of the second cylinder 5 into a hole 70 of relatively small diameter in the axial direction. Within the hole 70, a valve shaft 9a of a switching valve 9 is fitted, and the valve hole 90 of the valve shaft 9a communicates with the hole 70, and the switching hole 91 communicates with a right hand cylindrical hole 721 in this embodiment. Accordingly, the de-foamed resin P flows in the right hand jet hole 730 via the hole 721 and fills the metal mold cylinder 12b and goes upward in the metal mold cylinder 12b.

When the resin presses upward the intermediate cover 150, the limit plate 18 separates from the limit switch 16 as said above to stop drivings of the crushing shaft 4a and the rotating screw 8.

If the metal cylinder 12b is slightly upheaved by the handle 121 to remove the charging hole 120 from the nozzle body 73b, the metal cylinder 12b is made free, so that the resin is transferred by the handle 121 as it is into the cooling means such as the water tank.

When the motor 33 stops, the operating handle 9b is rotated 180°. Thus, the switching hole 91 communicates with the left hand cylinder hole 720 by the rotation of the valve shaft 9a, and at the same time the operating piece 9c contacts the limit switch 11a. Thereby, the motor 33 again start to drive, and the above mentioned forward sending—volume shrinking—deforming and pushing are carried out by the crushing shaft 4a and the rotating screw 8. The de-foamed and shrinked resin P fills the left hand metal cylinder 12a through the hole 70, the switching hole 91, the left cylinder hole 720 and the jet hole 730. The resin P upheaves the intermediate cover as said above to stop filling of the resin P.

For the period of the operation, since the right hand metal cylinder 12 having discharged the foam products is again set, the operating handle 9b is operated to direct the switching hole 91 toward the side of the metal mold cylinder 12b for again casting. The shrinking and reproduction may be performed by repeating the above mentioned cycle without any time lag In the present invention, it is not necessary to extrude the de-foamed and shrinked resin P into thin bar shapes and cut it into piece. Therefore, the extrude nozzle may be thick as a method of de-foaming and shrinking resins, the kneading rod 8c is used for de-foaming while securing a room of large capacity. Even if the foamed resins to be treated are mixed or fused with foreigners such as metal pieces, wood pieces, corrugated card boards and others, any troubles are not caused such as cloggings in the extruding mechanism. Since a cutter is not employed, any inconveniences do not occur as a result of cutter damage.

What is claimed is:
1. An apparatus for treating waste materials of foam resin products comprising:
   a) a main body frame 1 having a crushing room A having an opening in its upper part and a side wall, said crushing room A tapering downward;
   b) a hopper 2 in communication with said crushing room A and into which the waste materials of the foam resins are introduced;
   c) a crushing mechanism 3 comprising a plurality of stationary cutting edges 3c installed on said side wall of the crushing room A, and a rotatable crushing shaft 3a provided with a plurality of moving cutting edges 3b on the outer circumference of said shaft;
   d) a cylindrical volume shrinking mechanism B provided on the outer side of the crushing mechanism A, wherein said cylindrical volume shrinking mechanism B has a sending range S within an inlet port 41 communicating with the crushing room A for transferring the waste foam resin materials W destroyed by the crushing mechanism 3, a volume shrinking range T for heating to soften and fuse the waste resin pieces while transferring them, and a kneading and de-foaming range U for subsequently effecting heat and pressure to the softened and fused resin, thereby to de-foam said resin, said kneading and de-foaming range U having an extruding nozzle mechanism 7 with a jet hole 730 opening upward;
   e) a driving means 33 for driving the crushing shaft 3a and a rotation screw 8;
   f) a metal mold cylinder 12 having a hole 120 holding the jet hole 730 of the extruding nozzle mechanism 7, said metal mold cylinder 12 being vertically arranged along the sides of the hopper and the main frame; and
   g) a cover 15 for the metal mold cylinder attached to the side of the hopper 2 and having a switch ele- ment to stop driving of the rotating screw 8 when the shrinked resin P extruded from the extruding nozzle mechanism 7 within the metal mold cylinder reaches a certain amount.

2. The apparatus as claimed in claim 1, wherein the volume skrinking range T and the kneading and de-foaming range U of the cylindrical volume shrinking mechanism B are composed of a straight cylinder 5 smaller in inner diameter than a cylinder 4 composing the sending range S, and wherein the rotating screw 8 is rotatably disposed from the sending range S to the volume shrinking range T and terminates at the end of the volume shrinking range T, and wherein the rotating screw 8 is combined at its end with a kneading bar 8c having indentations on its outer circumference, said kneading bar being smaller in outer diameter than the diameter of the screw vane 8a.

3. The apparatus as claimed in claim 1, wherein the extruding nozzle mechanism 7 comprises an extruding nozzle body 73 immediately fixed at the upper end part of the cylinder 5 in the kneading and de-foaming range U which is closed with an end plate 19 in an axial direction.

4. The apparatus as claimed in claim 1, wherein the extruding nozzle mechanism 7 is provided with a base cylinder 71 having a hole 70 extending in the axial direction of the kneading and de-foaming range U and lateral holes 710, 711 diverging from said hole 70; diverging cylinders 72a, 72b having holes 720, 721 meeting the lateral holes 710, 711; and two nozzle main bodies 73a, 73b connecting to the diverging cylinders 72a, 72b, said axially extending hole 70 being provided with a switching valve 9 for switching a flow of the shrinked resin into the diverging holes 72a, 72b from the base cylinder 71.

5. The apparatus as claimed in claim 4, wherein the switching valve 9 has a valve shaft 9a fitting to the axially extending hole 70, which has a valve hole 90 coaxial with the axially extending hole 70 and a single switching hole 91 traversing the valve hole 90.

6. The apparatus as claimed in claim 4, wherein the switching valve 9 comprises a valve seat 9a with starting switches 11a, 11b for the driving means of the rotating screw 8, and the valve seat 9a comprises an operating piece 9c for starting switches 11a, 11b.

7. The apparatus as claimed in claim 1, wherein said main body frame 1 is fixed to a bed 75 allowing the extruding nozzle body to pass therethrough, and wherein the metal mold cylinder 12 is supported at its bottom by the bed 75 and held at its right and left sides by a holding arm 13 extending from the main body frame 1.

8. The apparatus as claimed in claim 1, wherein said hopper has a side wall, and wherein said cover body 15 is tiltably pivoted to the side wall of the hopper by a hinge 27 and comprises a suspending member 17 suspending an intermediate cover 150 an outside operating piece 18 having a bracket shape, a switch 16 for the drive means 33 of the rotating screw 8, so that the operating piece 18 separates from the switch 16 so as to stop the drive means 33 when the shrinked resin going upward within the metal mold cylinder upheaves the cover body 15 via the intermediate cover 150.

9. The apparatus as claimed in claim 1, wherein the cover body 15 is suspended movably in the vertical direction by an openable mechanism 14 of a clamp system and is provided with a fixing plate 150a having a switch 6 at the interior thereof, and the fixing plate 150a is arranged with the intermediate cover 150 serving also as a limit operating piece moveable in the vertical direction, so as to operate the switch 16 and stop the drive means 33 when the shrinked resin going upward within the metal mold cylinder upheaves the intermediate cover 150.

10. The apparatus as claimed in claim 1, wherein the moving cutting edges 3b of the crushing mechanism 3 have radii of gyration reaching within the hopper.

11. The apparatus as claimed in claim 1, wherein the crushing shaft 3a and the rotating screw 8 are driven by a single motor.

12. The apparatus as claimed in claim 1, wherein the main body frame 1 has casters at its lower parts.

* * * * *